United States Patent [19]

Bunting

[11] 4,049,321

[45] Sept. 20, 1977

[54] WASTE COLLECTION SYSTEMS

[75] Inventor: Keith Brian Bunting, Hazel Grove, England

[73] Assignee: Simon Container Machinery Limited, Stockport, England

[21] Appl. No.: 656,200

[22] Filed: Feb. 9, 1976

[30] Foreign Application Priority Data

Feb. 20, 1975 United Kingdom ................ 7256/75

[51] Int. Cl.[2] .............................................. B65G 53/40

[52] U.S. Cl. ......................................... 302/41; 15/301; 302/36

[58] Field of Search ....................... 302/17, 27, 36, 39, 302/41, 26, 52, 51; 15/300 R, 301, 312 R, 319, 345, 404; 30/41.5, 133; 51/273; 144/252 R

[56] References Cited

U.S. PATENT DOCUMENTS

| | | | |
|---|---|---|---|
| 827,831 | 8/1906 | Berendonck | 302/41 |
| 888,354 | 5/1908 | Rohde | 302/41 |
| 1,852,535 | 4/1932 | Moore | 302/36 X |
| 2,335,094 | 11/1943 | Wesselhoeft | 302/41 X |
| 2,879,536 | 3/1959 | Denning | 15/345 X |

*Primary Examiner*—Evon C. Blunk
*Assistant Examiner*—James L. Rowland
*Attorney, Agent, or Firm*—Norris & Bateman

[57] ABSTRACT

Apparatus for the removal of waste material from a manufacturing operation comprising a box into which the waste material is fed, lid means for the box movable between open and closed positions and means for establishing a current of conveying air through said box when said lid means is closed.

7 Claims, 3 Drawing Figures

WASTE COLLECTION SYSTEMS

This invention concerns the collection and removal of waste material from a machine performing a manufacturing operation, particularly, though not exclusively, the collection and removal of trim from a slotting machine in a line of machinery producing cases from corrugated paper board.

During the manufacture of cases from corrugated paper board, blanks of such board are passed through a number of so-called converting machines arranged in a line, one of which is a slotting machine which cuts pieces out from the blanks at required positions to enable the blanks subsequently to be folded and glued to form finished cases.

The pieces of trim falling from the slotting machine are normally directed by a first air conveyor outwardly from underneath the machine and then by a second air conveyor along the side of the machine to a duct which removes them pneumatically.

This arrangement requires the pieces of trim to be turned through a right-angle by the two air conveyors. This can cause accumulations of trim on the air conveyors which need to be cleared manually. Furthermore the pieces of trim falling from the slotting machine are normally conveyed pneumatically out of the factory building. This process involves the removal of large volumes of air from the factory building which can be as high as 10,000 cubic feet per minute per slotting machine and which may be at a different temperature from the outside atmosphere. This loss of heated or cooled air is extremely uneconomic, and becoming more so in view of the ever-rising costs of fuel for space heating or air-conditioning purposes.

It is an object of the present invention to provide improved apparatus for pneumatically removing waste material from a manufacturing operation to a position remote from the position where the waste is produced.

Thus, according to the present invention, there is provided apparatus for the removal of waste material from a manufacturing operation which comprises a box into which the waste material is fed, lid means for the box movable between open and closed positions and means for establishing a current of conveying air through said box when said lid means is closed.

Preferably said lid means is arranged to receive waste material on its upper surface when closed and to deposit such waste material in the box when moved to its open position.

Preferably the apparatus includes a plurality of boxes served by a single fan means for establishing said conveying pneumatic currents therethrough in turn.

The invention will be further apparent from the following description with reference to the several figures of the accompanying drawings which show, by way of example only, one form of apparatus embodying the invention and specifically adapted for the collection and removal of trim from a slotting machine in a line of converting machinery.

Figure 1:
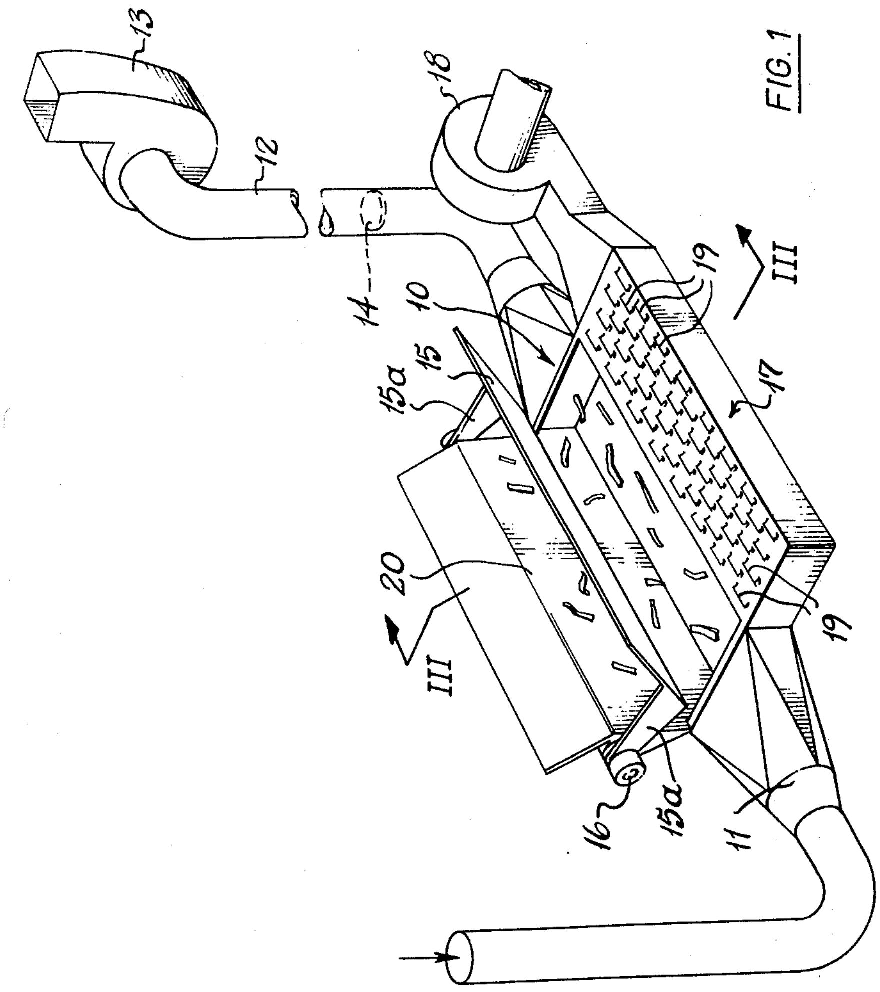
FIG. 1 shows a diagrammatic perspective view of the apparatus in one operative condition.
Figures 2, 3:
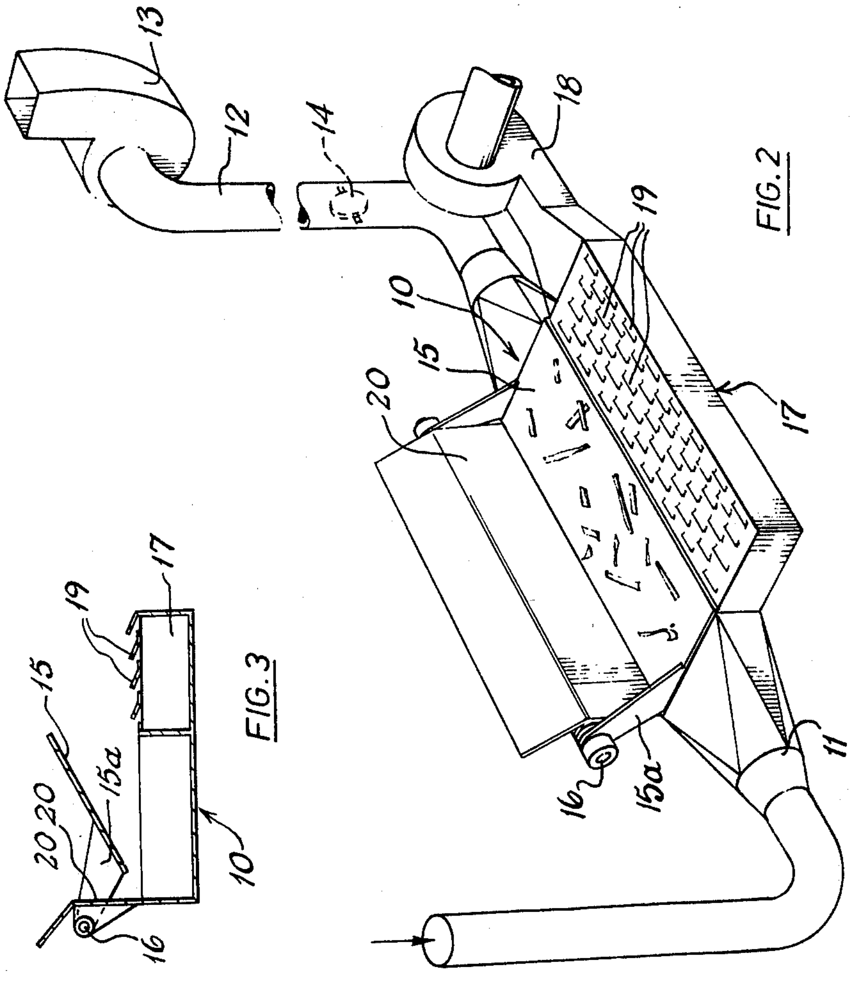
FIG. 2 shows a diagrammatic view similar to that of FIG. 1 of the apparatus in a second operative condition.

and FIG. 3 shows a cross-section through the apparatus on the line III—III of FIG. 1.

Referring now to the drawings, it will be seen that the apparatus includes a shallow rectangular box 10 located within a duct which extends outwardly from each of the opposed ends of the box 10. The portion 11 of the duct lying on one side of the box 10 extends to a position outside of the space housing the line of converting machinery, as does the portion 12 lying on the other side of the box 10, but via a suction fan 13. Thus, the ends of the ducts 11 and 12 remote from the box 10 may be located actually outside of the factory building or in an ancilliary area of the factory building which is neither heated non air-conditioned. A butterfly valve 14 is included in the duct 12 at a position between the box 10 and fan 13 for a purpose which will be apparent hereinafter.

The box 10 is provided with a lid 15 having upwardly extending tongues 15*a* at its opposed ends by which the lid 15 is pivotally mounted on a longitudinal axis 16 located above and to the side of the box 10 whereby the lid is capable of movement between an open position (FIG. 1) and a closed position (FIG. 2) by means of any suitable actuating device such as a pneumatic cylinder (not shown).

In use, the lid 15 will normally be in its open position with the valve 14 closed as shown in FIG. 1 and waste trim material from the slotting machine is deposited in the box 10. This may conveniently be achieved by means of an air conveyor generally indicated at 17 arranged to convey material falling thereonto under the influence of gravity towards the box 10. The air conveyor 17 is comprised by a plenum chamber which is supplied with pressure air from a fan 18 and which has louvres 19 in its top wall which establish currents of air directed towards the box 10.

At periodic intervals (determined by the rate of delivery of material to the box 10) the lid 15 will be closed and the butterfly valve 14 opened whereby the fan 13 serves to draw air from a position outside of the space housing the line of converting machinery and establish a conveying pneumatic air stream through the box 10 to a further position outside such space where the waste material is separated from the conveying air stream by any suitable conventional means such as a cyclone, for example.

During the period when the box 10 is thus being emptied, material will continue to be delivered by the air conveyor 17 but will come to rest on the lid 15 of the box which is then in its closed position. A baffle plate 20 is provided to ensure that material comes to rest on the lid 15 and does not pass beyond same. After the box 10 has been emptied the current of air therethrough will be arrested by closure of valve 14 and the lid 15 opened. As the lid opens it swings about the axis 16 and thus directs any material which has collected on its upper surface into the interior of the box 10 under the influence of gravity.

Normally a single fan 13 may serve a number of collecting boxes 10 at different locations. Conveniently the fan 13 would be running continuously and the valve 14 associated with the boxes 10 would be opened in turn to empty each of the boxes 10 in turn. It will be understood that in this arrangement, besides the advantage of not drawing air which has been heated or cooled by air-conditioning from within the space housing the line of converting machinery, the apparatus has the further advantage that the single fan is used to collect waste material from a plurality of machines with a consequent saving in power compared with the more conventional continuous pneumatic conveying from each of a plurality of locations simultaneously.

It will be appreciated that it is not intended to limit the invention to the above example only, many variations, such as might readily occur to one skilled in the art, being possible without departing from the scope thereof as defined by the appended claims.

Thus, for example, the lid 15 need not have tongues 15*a* and may be pivoted about an axis lying in the plane of the top of the box laterally offset to one side of the longitudinal centre line of the top of the box.

What is claimed is:

1. Apparatus for the removal of waste material produced from a manufacturing operation comprising a box into which the waste material may be fed, said box having a top opening through which said waste material may be introduced, lid means for the box mounted to be movable between a box-open position wherein it uncovers said opening and a box-closed position wherein it closes said opening, means whereby said lid means in box-closed position accummulates waste material and whereby said accummulated waste material is introduced through said opening into said box when said lid means is moved from box-closed to box-open position, and means for establishing a current of conveying air through said box when said lid means is in said box-closed position.

2. Apparatus according to claim 1 wherein separate ducts connect opposed open ends of the box to positions outside of the space in which said manufacturing operation is housed.

3. Apparatus according to claim 1 wherein said lid means is constructed and arranged to receive waste material on its upper surface when in box-closed position and to deposit such waste material directly in the box when moved to its box-open position.

4. Apparatus according to claim 2 wherein valve means is included in one of said ducts, which valve means is adpated to be opened to establish said current of conveying air whenever said lid means is in box-closed position.

5. In the apparatus defined in claim 1, deflector means adjacent said box constructed and arranged to direct waste material onto the upper surface of said lid means when the lid means is in box-closed position.

6. In the apparatus defined in claim 5, said deflector means being a baffle plate fixed on and extending above said box.

7. In the apparatus defined in claim 5, said air conveying means including means defining a chamber alongside said box, said chamber having a top wall provided with apertures that are constructed and arranged to direct waste material toward said deflector means in the box-closed position of said lid means.

* * * * *